(12) United States Patent
Kim et al.

(10) Patent No.: US 10,038,311 B2
(45) Date of Patent: Jul. 31, 2018

(54) MODULE REPLACEMENT DEVICE OF HIGH VOLTAGE DIRECT CURRENT TRANSMISSION SYSTEM

(71) Applicant: HYOSUNG CORPORATION, Seoul (KR)

(72) Inventors: June-Sung Kim, Anyang-si (KR); Hong-Ju Jung, Seoul (KR); Jung-Soo Park, Uiwang-si (KR); Doo-Young Lee, Anyang-si (KR); Jong-Yun Choi, Hwaseong-si (KR)

(73) Assignee: HYOSUNG CORPORATION, Seoul (KR)

( * ) Notice: Subject to any disclaimer, the term of this patent is extended or adjusted under 35 U.S.C. 154(b) by 0 days.

(21) Appl. No.: 15/501,764

(22) PCT Filed: Jul. 8, 2015

(86) PCT No.: PCT/KR2015/007064
§ 371 (c)(1),
(2) Date: Feb. 3, 2017

(87) PCT Pub. No.: WO2016/021841
PCT Pub. Date: Feb. 11, 2016

(65) Prior Publication Data
US 2017/0229845 A1    Aug. 10, 2017

(30) Foreign Application Priority Data

Aug. 5, 2014 (KR) .................. 10-2014-0100222

(51) Int. Cl.
*H02B 1/36* (2006.01)
*H02J 1/00* (2006.01)
*H02B 1/30* (2006.01)

(52) U.S. Cl.
CPC ............. *H02B 1/36* (2013.01); *H02B 1/303* (2013.01); *H02B 1/306* (2013.01); *H02B 1/308* (2013.01); *H02J 1/00* (2013.01)

(58) Field of Classification Search
None
See application file for complete search history.

(56) References Cited

U.S. PATENT DOCUMENTS 3,964,573 A * 6/1976 Wilson ............... B66F 9/02
                                                    182/116
4,265,583 A * 5/1981 Baird ................. B66F 9/12
                                                    414/246

(Continued)

FOREIGN PATENT DOCUMENTS

JP       06-165494 A       6/1994
JP       06-343267 A       12/1994
(Continued)

*Primary Examiner* — Courtney Smith
(74) *Attorney, Agent, or Firm* — Novick, Kim & Lee, PLLC; Jae Youn Kim

(57) ABSTRACT

Provided is a module replacement device of a high voltage direct current transmission system. In the device, a replacement base is provided in a structure by using a support member such that a sub-module movably provided at a fixing base of the structure can be replaced by being withdrawn outside of the structure. Further, the replacement base can easily and firmly be provided in the structure such that the module can be replaced in an easy and safe manner.

11 Claims, 6 Drawing Sheets

(56) References Cited

U.S. PATENT DOCUMENTS

| | | | | |
|---|---|---|---|---|
| 9,108,828 B2* | 8/2015 | Bolde | ................... | B66F 9/141 |
| 9,156,614 B2* | 10/2015 | Ono | ..................... | H02B 3/00 |
| 2003/0221914 A1* | 12/2003 | Smith | ................... | B66F 9/122 |
| | | | | 187/244 |
| 2016/0294166 A1* | 10/2016 | Kim | ....................... | H02J 1/10 |

FOREIGN PATENT DOCUMENTS

| | | |
|---|---|---|
| JP | 07-176687 A | 7/1995 |
| JP | 08-162609 A | 6/1996 |
| KR | 10-1288679 B1 | 7/2013 |
| KR | 20-2014-0003542 U | 6/2014 |

* cited by examiner

MODULE REPLACEMENT DEVICE OF HIGH VOLTAGE DIRECT CURRENT TRANSMISSION SYSTEM

TECHNICAL FIELD

The present invention relates generally to a module replacement device of a high voltage direct current transmission system. More particularly, the present invention relates to a module replacement device of a high voltage direct current transmission system allowing a sub-module provided at a high place to be replaced by being withdrawn for maintenance thereon.

BACKGROUND ART

In general, an HVDC transmission system (high voltage direct current transmission system) is a method where electrical power is transmitted by converting alternating current generated from a power plant into direct current and then supplied by reconverting the direct current into alternating current at the service entrance point. The high voltage direct current transmission system suffers lower electrical losses than an AC transmission system, may have improved stability through line separation, and is suitable for long-distance transmission due to less inductive disturbance.

In a high voltage direct current transmission system, a plurality of sub-modules is mounted to a structure called a converter module, which is ten meters high and has a plurality of stories. The sub-module is a heavy object weighing more than 200 kg, so an aerial ladder truck is required for maintenance work on the sub-module. An aerial ladder truck is generally used because it is impossible to mount an overhead travelling crane to a substation, such as a converter module.

In the case where an aerial ladder truck is used, moving the heavy sub-module to the aerial ladder truck from the high rise structure is dangerous and difficult. The aerial ladder truck is generally powered by hydraulic pressure, so even when the load capacity is higher than the weight of the sub-module, the sudden shift of the weight caused by the heavy material makes center of gravity of the aerial ladder truck suddenly change, thereby causing a safety problem.

Further, considering the weight of the sub-module, it is very dangerous and difficult for a worker to move the sub-module to the aerial ladder truck in the structure. In particular, it is hard and dangerous for the worker on the aerial ladder truck to withdraw the heavy sub-module from the structure and load the module to the aerial ladder truck.

DISCLOSURE

Technical Problem

Accordingly, the present invention has been made keeping in mind the above problems occurring in the related art, and the present invention is intended to propose a high voltage direct current transmission system allowing a sub-module to be easily moved from the structure to an aerial ladder truck for maintenance work thereon.

Technical Solution

In order to achieve the above object, according to one aspect of the present invention, there is provided a module replacement device of a high voltage direct current transmission system, wherein a module is replaced by being withdrawn outside a structure of a high voltage direct current transmission system in a state where the module replacement device is provided in the structure of the system, the module replacement device including: a replacement base provided such that a rear end thereof is seated in an insulation support part of the structure and a front end thereof extends in a forward direction of the structure such that the module is seated therein after being withdrawn; and a support member connected to the front end of the replacement base at a first end thereof and connected to the structure at a second end thereof so as to support the replacement base to be horizontal.

The rear end of the replacement base may be hooked to the insulation support part of the structure so as to be prevented from moving in forward and inward directions of the structure.

The replacement base may include: a base plate formed with side walls at opposite sides in a width direction thereof; a connection guide part provided at each of opposite sides of a rear end of the base plate such that a fixing base provided in the structure is guided to an inside of the base plate; and a guide rail provided at each of the opposite sides in the width direction of the base plate by extending in parallel to each other so as to guide movement of the module.

A first hook may be provided at the rear end of the base plate by being supported by the insulation support part, so as to prevent the replacement base from moving to an inside of the structure; and a second hook may be provided at a rear end of a guide bottom surface forming the connection guide part by being supported by the insulation support part, so as to prevent the replacement base from moving outside the structure.

The base plate defining a rear end of the guide rail may be provided with a rail connection guide having a rail slot so as to guide a fixing rail of the fixing base provided in the structure to be matched with the guide rail.

The rail connection guide may include: the guide bottom surface provided by extending from the base plate; and a guide side wall provided by bending from the guide bottom surface and by extending from each of the side walls formed on the base plate, wherein the guide side wall is provided with an enlarged part that extends inclinedly from the side wall.

The support member may include a wire provided with a connecting ring at, at least one of opposite ends of the wire, with a turn buckle provided at an end of the wire such that the replacement base is horizontally mounted.

The replacement base may further include a level.

Advantageous Effects

According to the present invention having the above-described characteristics, the advantageous effects of the present invention are as follows.

In the present invention, when a replacement base is mounted to a structure of a high voltage direct current transmission system, the replacement base is prevented from moving to the front or the inside of the structure by hooking the rear end of the replacement base to an insulation support part of the structure, and also the front end of the replacement base is supported by using a support member, and thus it is possible to easily replace a module from the structure of the system.

Further, in the present invention, the rear end of the replacement base is provided with a connection guide part, and thereby it is possible to easily connect the replacement base with a fixing base mounted to the structure.

Further, in the present invention, the rear end of the replacement base is provided with a rail connection guide having a rail slot that allows a fixing rail of the fixing base of the structure to be matched with a guide rail of the replacement base, whereby the fixing rail is easily matched with the guide rail, and thus it is possible to easily withdraw the module from the structure.

Furthermore, in the present invention, the support member is connected to a turn buckle in order to be used, and the replacement base is provided a level to level the replacement base, and thus it is possible to safely handle the heavy module at a high place.

BEST MODE

Figure 1:
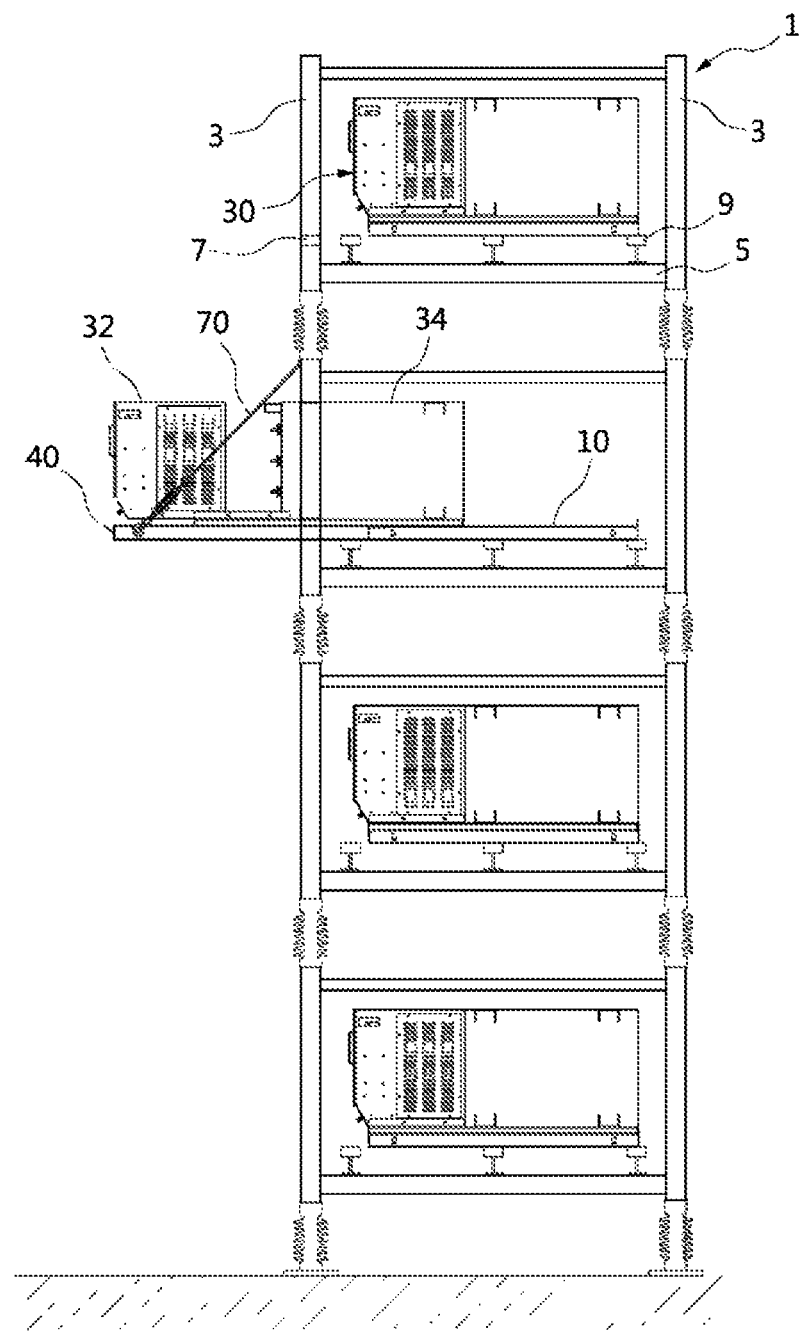
FIG. 1 is a side view illustrating a state where a preferred embodiment of a module replacement device of a high voltage direct current transmission system according to the present invention is applied to a structure.
Figure 2:
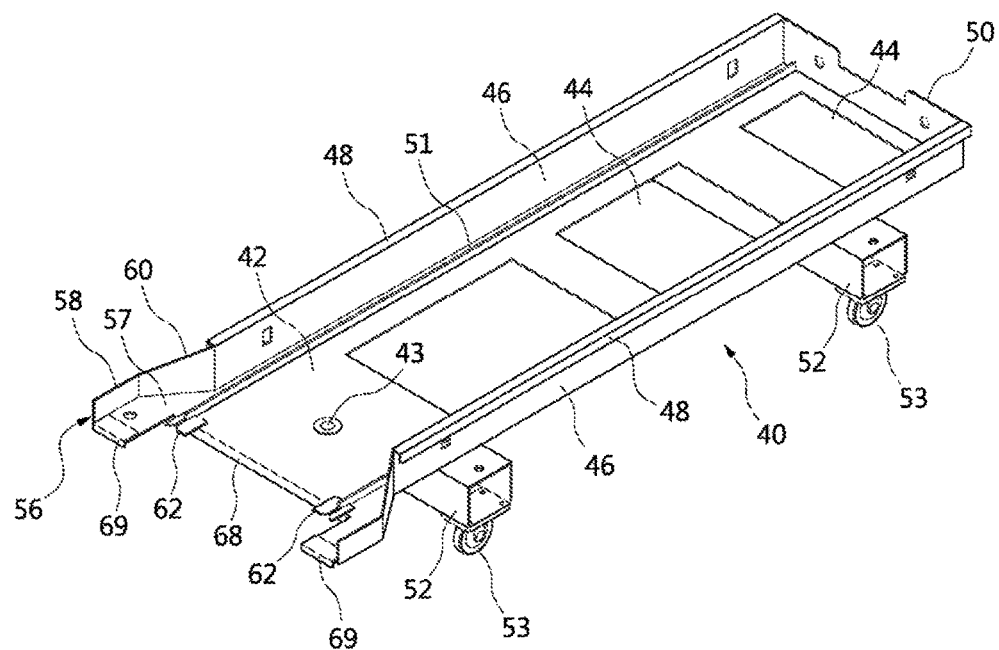
FIG. 2 is a perspective view illustrating a replacement base included in the embodiment shown in FIG. 1.
Figure 3:
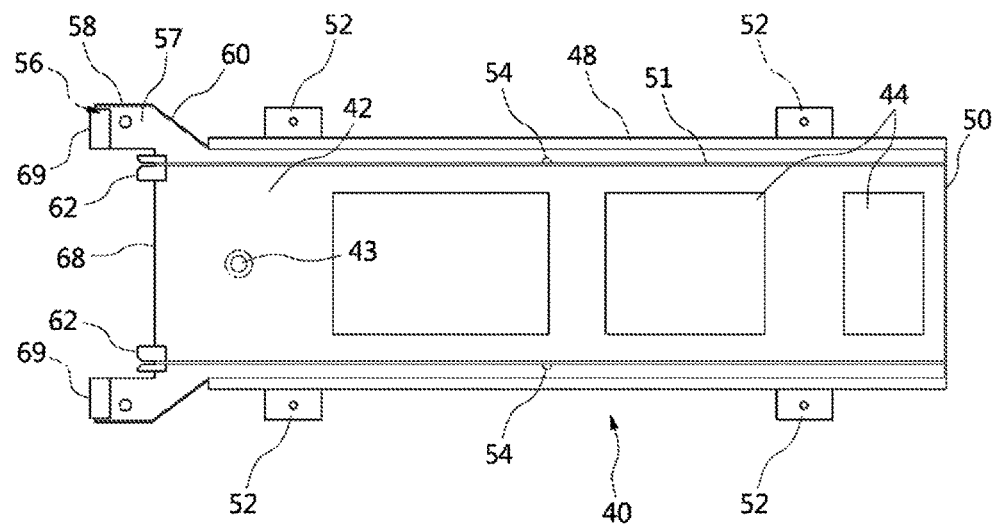
FIG. 3 is a plane view illustrating the replacement base included in the embodiment shown in FIG. 1.

Reference will now be made in greater detail to an exemplary embodiment of the present invention, an example of which is illustrated in the accompanying drawings. Wherever possible, the same reference numerals will be used throughout the drawings and the description to refer to the same or like parts. Further, in the following description of the invention, if the related known functions or specific instructions on configuring the gist of the present invention unnecessarily obscure the gist of the invention, the detailed description thereof will be omitted.

Further, it will be understood that, although the terms first, second, A, B, (a), (b), etc. may be used herein to describe various elements, these elements should not be limited by these terms. These terms are only used to distinguish one element, from another element. It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Further, in the following description of the invention, a sub-module is an example of a module of a high voltage direct current transmission system.

According to the accompanying drawings, a structure 1 of a high voltage direct current transmission system is set perpendicular to the ground. The structure 1 is configured such that a plurality of column frame members 3 are vertically provided from the ground and a bottom frame member 5 is provided in parallel with the ground so as to connect the column frame members 3 together. The bottom frame member 5 is configured such that a portion thereof is disposed at a front end of the structure 1, which is denoted as a front end frame member 7.

The structure 1 has a plurality of stories, and in the embodiment the structure has four stories. The stories are each provided with a sub-module 30, which will be described hereinbelow. The stories are each provided with an insulation support part 9 on the bottom frame member 5. The insulation support part 9 serves to insulate between the structure 1 and the sub-module 30 with a mat made of silicon material, which is provided on the insulation support part 9.

Figure 4:
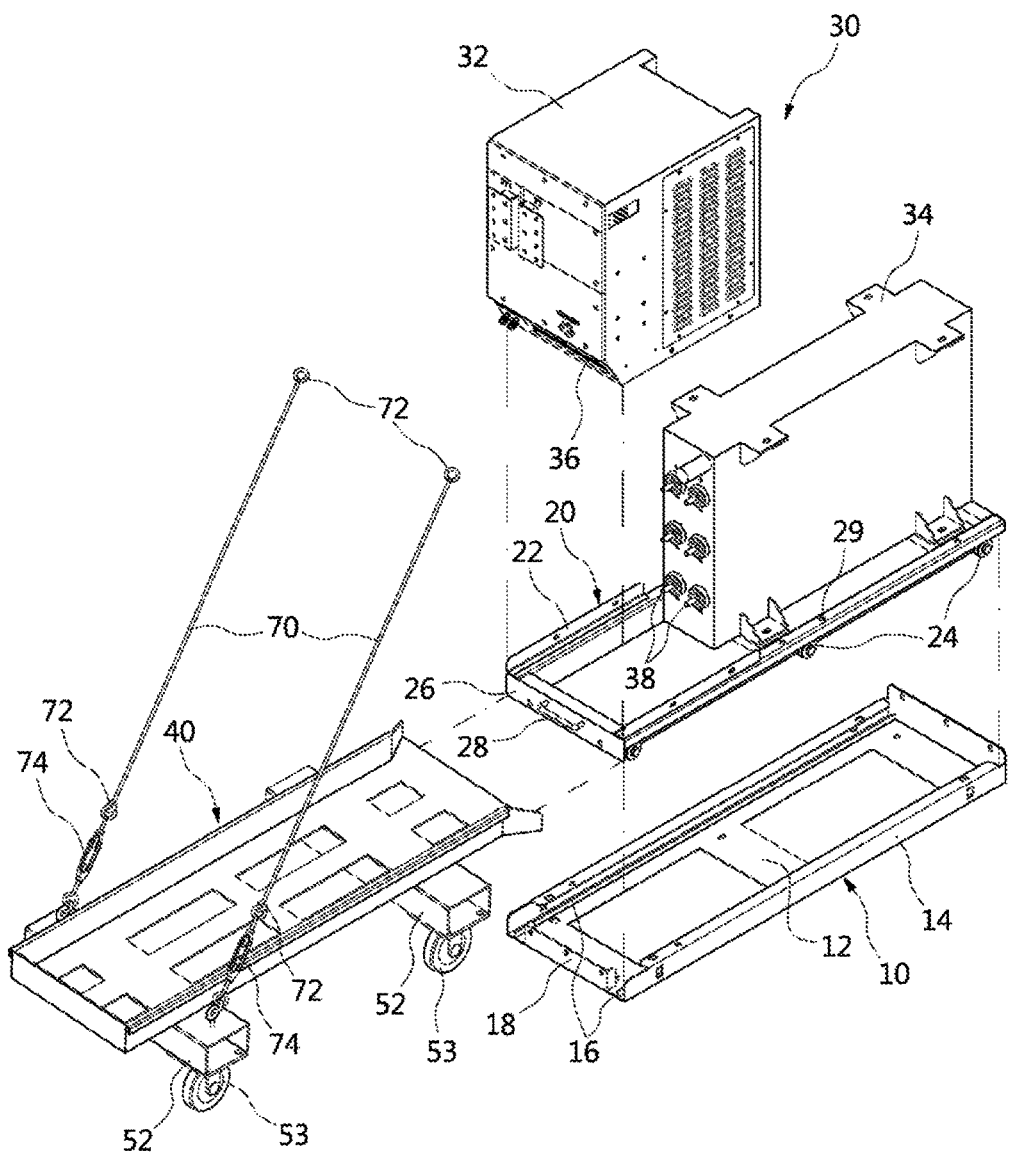
FIG. 4 is an exploded view illustrating configurations of a sub-module, a movable base, and a replacement base, each of which is mounted to the structure shown in FIG. 1.
Figure 5:
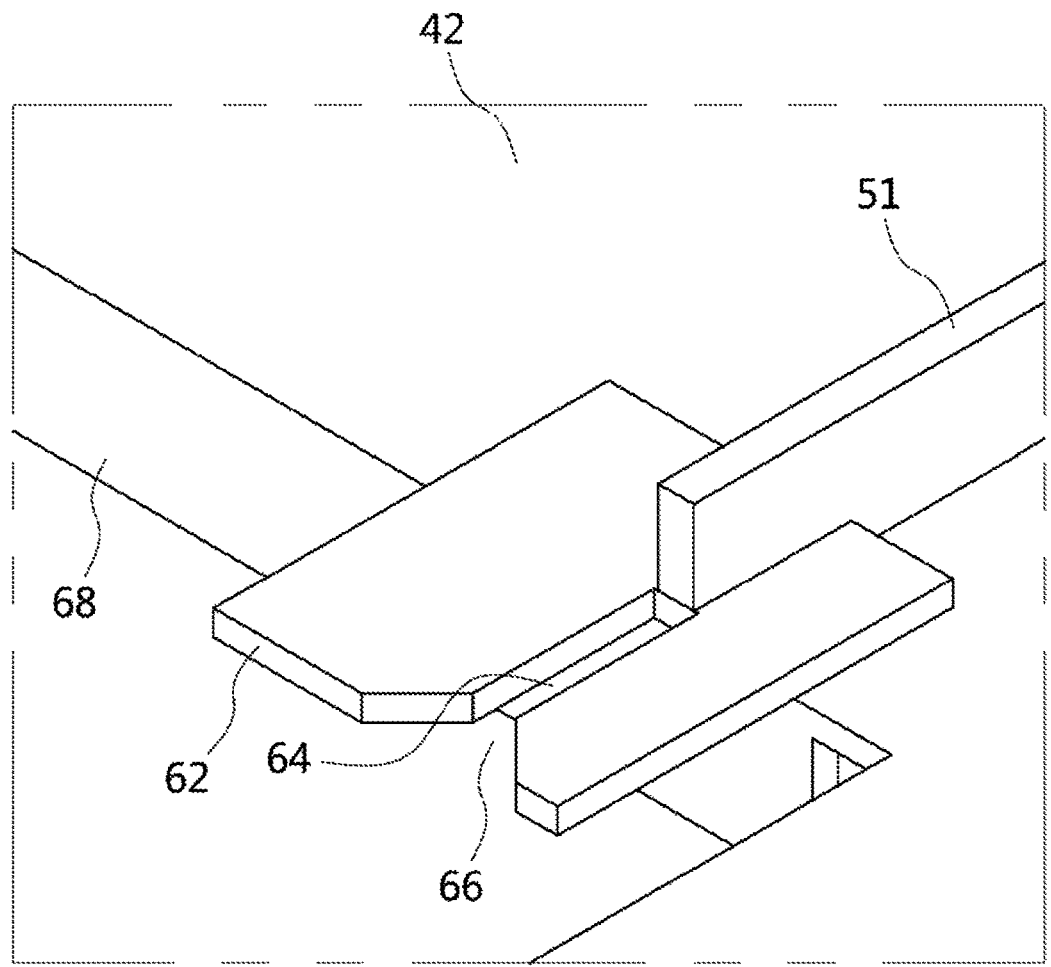
FIG. 5 is a perspective view illustrating a configuration of a rail connection guide according to the embodiment shown in FIG. 1.
Figure 6:
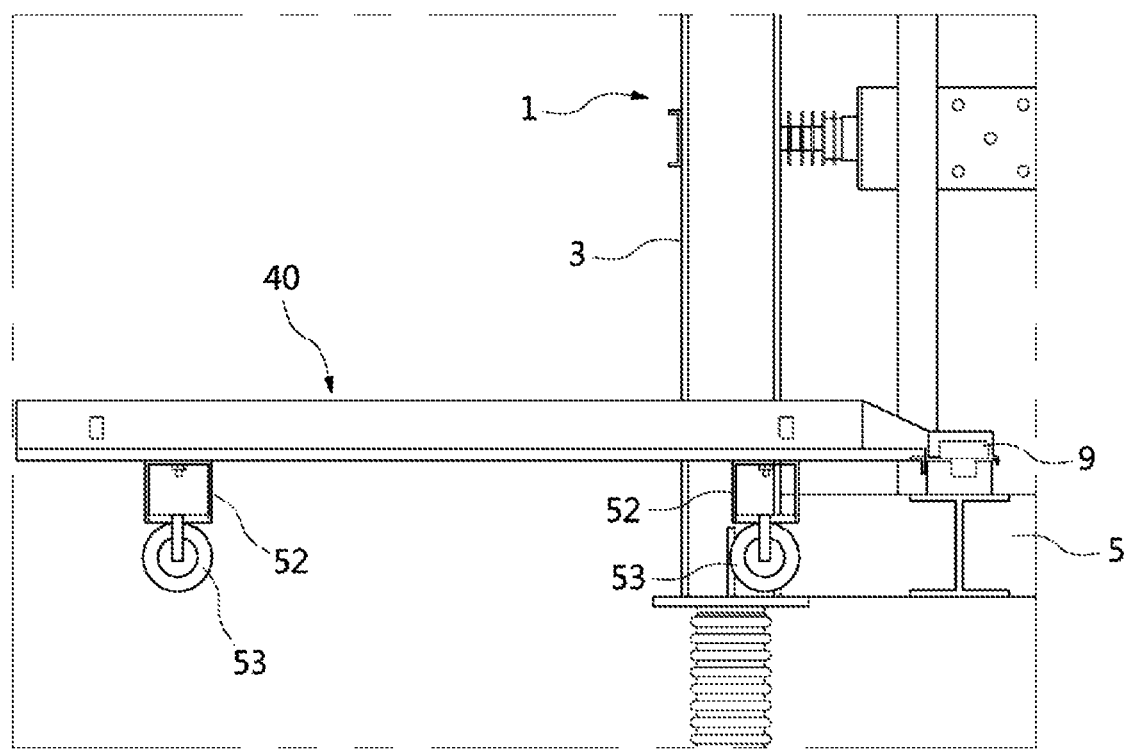
FIG. 6 is a side view illustrating a configuration of the embodiment shown in FIG. 1.

The insulation support part 9 is fixedly provided with a fixing base 10 thereon. FIG. 4 illustrates a configuration of the fixing base 10. The fixing base 10 is provided with a side wall 14 at each of opposite sides of the rectangular bottom plate 12 by extending in forward and backward directions thereof The bottom plate 12 is provided with a fixing rail 16 thereon by extending in forward and backward directions of the fixing base 10. A pair of the fixing rails 16 extends in parallel to each other in a width direction of the bottom plate 12 of the fixing base 10 while being spaced apart from each other at predetermined intervals.

The bottom plate 12 is provided with a front end wall 18 at a front end thereof, wherein a part around the fixing rail 16 is not provided with the front end wall 18 so as to allow movable rollers 24 of a movable base 20, which will be described hereinbelow, to move to a guide rail 51 of a replacement base 40, which will be described hereinbelow, along the fixing rail 16 without being obstructed by the front end wall 18.

The fixing base 10 is movably provided with the movable base 20 thereon. FIG. 4 illustrates a configuration of the movable base 20, and the movable base 20 is framed by a movable base frame 22. The movable base frame 22 is formed into a quadrangular shape and is provided with a plurality of movable rollers 24 on opposite sides in a width direction thereof. In the embodiment, three movable rollers 24 are provided on one side of the movable base frame. A front end member 26, which is provided at a front end of the movable base 20, is provided with a handle 28 so as to allow a worker to easily move the movable base 20 along the fixing base 10.

The movable base 20 is provided with a stopper hole 29 on a side thereof. The stopper hole 29 is for allowing the movable base 20 to be locked to the fixing base 10 or to the replacement base 40 that will be described hereinbelow. The movable base is locked to the fixing base 10 or to the replacement base 40 by inserting a fixing bar (not shown) that penetrates through the stopper hole 29 into the fixing base 10 or into the replacement base 40.

The sub-module 30 is mounted on the movable base 20. The sub-module 30 is largely divided into a power part 32 and a capacity part 34. Reference numeral 36 denotes a display part 36 of the sub-module 30, and reference numeral 38 denotes a signal connector that electrically connects the power part 32 with the capacity part 34. For reference, the power part 32 is a part provided with a variety of power semiconductors and control boards.

Next, reference will be made to an element for allowing the sub-module 30 to be withdrawn outside the structure 1 for replacement. The replacement base 40 is used to withdraw the sub-module 30 from each story of the structure 1.

The replacement base 40 is in a rectangular shape from a plane view and extends in forward and backward directions to be long.

The replacement base 40 is framed by a base plate 42, wherein the base plate 42 is in a rectangular planar shape. The base plate 42 is provided with a level 53 on a side thereof. The level 53 allows determining that the base plate 42 is horizontally placed, wherein the inside of the level is filled with water so as to check whether the base plate is level or not by seeing the water. The base plate 42 is formed with a plurality of openings 44. The openings 44 may serve to minimize the weight of the replacement base 40.

The base plate 42 is provided with side walls 46 along opposite sides in a width direction thereof. The side walls 46 may be formed by bending from the opposite sides in a width direction of the base plate 42 at a right angle. By forming the side walls 46, a space over the base plate 42 is distinguished from the outside. The side walls 46 are each formed with a reinforcing bent part 48 by bending from an upper portion thereof The reinforcing bent part 48 is formed by being bent twice at right angles from the upper portion of the side wall 46. The reinforcing bent part 48 is configured such that a front edge thereof faces the side wall 46 in parallel while being spaced apart from each other at predetermined intervals. By forming the reinforcing bent part 48, strength of the side walls 46 is improved.

The base plate 42 is provided with a front end wall 50 at a front end thereof The front end wall 50 connects the side walls 46 together that are respectively provided at opposite sides of the base plate. The front end wall 50 serves to prevent the sub-module 30 from moving further forward on the base plate 42.

The base plate 42 is provided with a leg bar 52 on a bottom surface thereof. In the embodiment, two leg bars 52 are provided apart from each other at a predetermined interval. The leg bar 52 is provided with a wheel 53. The wheel 53 allows the replacement base 40 to be easily moved with the sub-module 30 mounted thereto.

The base plate 42 is provided with a fixing hole 54 therethrough. The fixing hole 54 allows the movable base 20, on which the sub-module 30 is seated, to be locked to the replacement base 40. In other words, when the fixing bar is penetrated through the fixing hole in a state where the stopper hole 29 provided in the movable base 20 is matched with the fixing hole, the movable base 20 is locked to the replacement base 40.

The base plate 42 is provided with a connection guide part 56 at each of the opposite ends of the rear end thereof. The connection guide part 56 allows a front end of the fixing base 10 to be easily guided to the rear end of the base plate 42 when the replacement base 40 is placed in the structure 1.

The connection guide part 56 includes a guide bottom surface 57 provided by extending from the base plate 42, with a guide side wall 58 provided by bending the guide bottom surface 57 at a right angle. The guide side wall 58 is configured such that a portion thereof extends inclinedly relative to an extending direction of the side wall 46 such that a gap between the opposite guide side walls 58 becomes gradually wider. This portion, namely the portion of the guide side wall 58 that extends inclinedly relative to an extending direction of the side wall 46, is denoted as an enlarged part 60.

The rear end of the base plate 42 is provided with a rail connection guide 62 at a location defining an end of the guide rail 51. The rail connection guide 62 serves to guide the fixing rail 16 of the fixing base 10 to be exactly matched with the guide rail 51. To achieve this, the rail connection guide 62 is provided with a rail slot 64. The rail slot 64 is formed through the rail connection guide 62, wherein the guide rail 51 is disposed at an end of the rail slot. The rail slot 64 has a mouth 66 that is wider in width than the rest of the rail slot. The mouth 66 is configured such that a width thereof becomes gradually narrower as approaching the inside of the rail slot 64 so as to allow the fixing rail 16 to be exactly guided to the rail slot 64.

The base plate 42 is provided with a first hook 68 at the rear end thereof. The first hook 68 is formed by bending from the rear end of the base plate 42. The first hook 68 serves to prevent the replacement base 40 from moving further into the inside of the structure 1 by being hooked to the insulation support part 9.

The connection guide part 56 is provided with a second hook 69 at a rear end thereof The second hook 69 is formed by bending from the rear end of the guide bottom surface 57. Of course, the first hook 68 or the second hook 69 may be provided by being made separately from the base plate 42 or the guide bottom surface 57. The second hook 69 serves to prevent the replacement base 40 from being separated from the structure 1 by being hooked to the insulation support part 9.

A support member 70 is provided to allow the replacement base to be horizontal in a state where the replacement base 40 protrudes in front of the structure 1. As shown in FIG. 4, the support member 70 is a wire provided with a connecting ring 72 at each of opposite ends thereof. The connecting ring 72 is configured such that one side thereof is connected to the bottom frame member 5 of the structure 1. The connecting ring 72 may be operated by one touch. For example, the connecting ring 72 having a structure like a carabiner may be used.

The support member 70 is provided with a turn buckle 74 at an end thereof. The turn buckle 74 controls a state where the replacement base 40 is supported, in cooperation with the support member 70. The turn buckle 74 is reduced in length by turning the turn buckle such that the replacement base 40 stays horizontal. The turn buckle 74 is connected to the leg bar 52 at a first side thereof and connected to the support member 70 at a second side thereof so as to adjust a location of the replacement base 40.

Reference will be made in detail to use of the module replacement device of a high voltage direct current transmission system according to the present invention configured as described above.

In the present invention, the replacement base 40 is mounted to the structure 1, in which the sub-module 30 to be replaced is. In other words, the rear end of the base plate 42 of the replacement base 40 is placed at a location corresponding to the fixing base 10, on which the sub-module 30 to be replaced is.

The insulation support part 9 is located between the first hook 68 and the second hook 69 of the replacement base 40, and the front end of the fixing base 10 is inserted between the connection guide parts 56. As the front end of the fixing base 10 is inserted between the connection guide parts 56, the fixing rail 16 of the fixing base 10 is guided to the mouth 66 of the rail connection guide 62 of the replacement base 40. When the fixing rail 16 is inserted into the rail slot 64 via the mouth 66, an end portion of the rail slot 64 meets an end portion of the guide rail 51. The fixing rail 16 meets the guide rail 51, whereby the movable base 20, to which the sub-module 30 is mounted, is easily moved.

Next, the replacement base 40 is supported to the structure 1 by using the support member 70. In particular, the support member 70 supports the replacement base 40 by being connected to a side of the front end of the replacement base 40. The first side of the connecting ring 72 of the support member 70 is connected to the turn buckle 74, an end of which is hooked to each of the opposite ends of the leg bar 52 disposed at the front end of the replacement base 40, and the second side of the connecting ring 72 is connected to the structure 1.

Further, the turn buckle 74 is manipulated such that the replacement base 40 is horizontal. To level the replacement base 40, the level 43 is checked while manipulating the turn buckle 74.

In a state where the replacement base 40 is horizontal, the rear end of the base plate 42 is seated in and hooked to the insulation support part 9 of the structure 1, whereby the replacement base 40 cannot move to the front or the back of the structure 1. In particular, the first hook 68 and the second hook 69 are respectively disposed at a front end and a rear end of the insulation support part 9, whereby the first hook 68 is hooked to the insulation support part 9, and thus the replacement base is prevented from moving to the back of the structure 1, namely to the inside of the structure. The second hook 69 is hooked to the insulation support part 9, and thus the replacement base is prevented from moving to the front of the structure 1.

After the replacement base 40 is placed in the structure 1, the sub-module 30 is moved to the replacement base 40. In other words, the movable base 20 is moved using the handle 28 so that the sub-module 30 mounted to the movable base 20 can be moved. When the movable rollers 24 of the movable base 20 move along the fixing rail 16 of the fixing base 10 and the guide rail 1 of the replacement base 40, the sub-module 30 is moved to the replacement base 40.

After the movable base 20 is moved to the replacement base 40, the fixing bar penetrates through the stopper hole 29 of the movable base 20 such that a part thereof is inserted into the fixing hole 54 of the replacement base 40. Thereby, the movable base 20 is locked to the replacement base 40 so as not to move undesirably.

Figure 7:
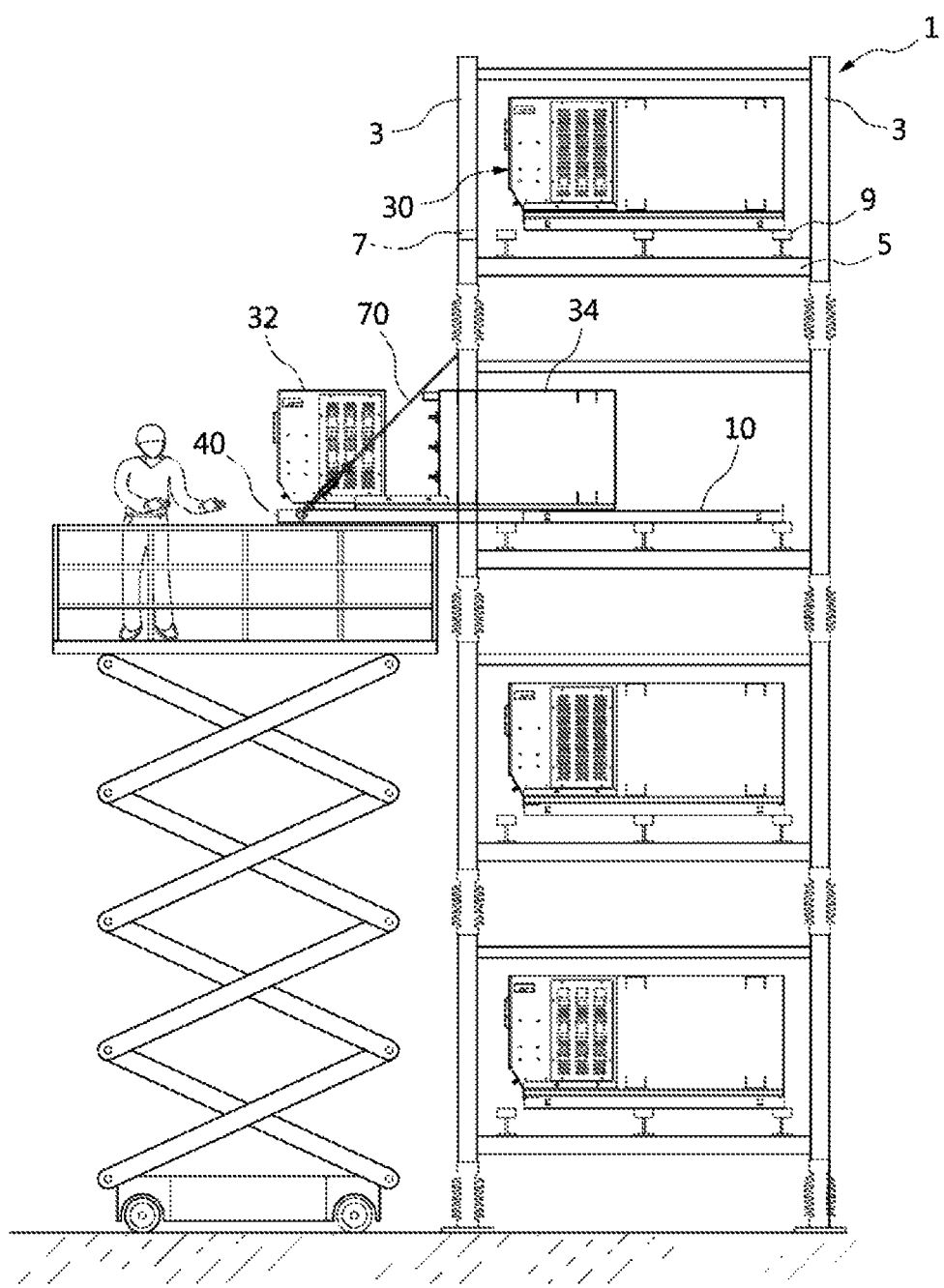
FIG. 7 is a view illustrating replacement of the sub-module by using a replacement device according to the embodiment of the present invention.

For reference, the replacement base 40 has a length to accommodate both the power part 32 and the capacity part 34 of the sub-module 30. However, only the power part 32 may be replaced. In this case, the replacement base 40 may be replaced by detaching the power part from the capacity part 34 in a state where the power part 32 is moved to be placed on the replacement base 40. FIG. 7 is a view illustrating the work mentioned above.

Although a preferred embodiment of the present invention has been described for illustrative purposes, those skilled in the art will appreciate that various modifications, additions and substitutions are possible, without departing from the scope and spirit of the invention as disclosed in the accompanying claims. Thus, the embodiment is therefore illustrative and not restrictive, since the scope of the invention is defined by the appended claims rather than by the description preceding them, and all changes that fall within meets and bounds of the claims, or equivalence of such meets and bounds are therefore intended to be embraced by the claims.

For reference, the wire forming the support member 70 may not necessarily be required to be provided with the connecting ring 72 at each of the opposite ends thereof, and thus at least one of the opposite ends of the wire may be provided with the connecting ring 72. The turn buckle 74 may not necessarily be disposed between the support member 70 and the replacement base 40. For example, the turn buckle may be disposed in the middle of the support member 70 or disposed between the support member 70 and the structure 1.

The invention claimed is:

1. A module replacement device of a high voltage direct current transmission system, wherein a module is replaced by being withdrawn outside a structure of the high voltage direct current transmission system in a state where the module replacement device is provided in the structure of the system, the module replacement device comprising:
   a replacement base provided such that a rear end thereof is seated in an insulation support part of the structure for electrically insulating between the structure and the module and a front end thereof extends in a forward direction of the structure such that the module is seated therein after being withdrawn; and
   a support member connected to the front end of the replacement base at a first end thereof and connected to the structure at a second end thereof so as to support the replacement base to be horizontal,
   wherein the rear end of the replacement base is hooked to the insulation support part of the structure so as to be prevented from moving in forward and inward directions of the structure.

2. The module replacement device of claim 1, wherein the replacement base includes:
   a base plate formed with side walls at opposite sides in a width direction thereof;
   a connection guide part provided at each of opposite sides of a rear end of the base plate such that a fixing base provided in the structure is guided to an inside of the base plate; and
   a guide rail provided at each of the opposite sides in the width direction of the base plate by extending in parallel to each other so as to guide movement of the module.

3. The module replacement device of claim 2, wherein
   a first hook is provided at the rear end of the base plate by being supported by the insulation support part, so as to prevent the replacement base from moving to an inside of the structure; and
   a second hook is provided at a rear end of a guide bottom surface forming the connection guide part by being supported by the insulation support part, so as to prevent the replacement base from moving outside the structure.

4. The module replacement device of claim 3, wherein the base plate defining a rear end of the guide rail is provided with a rail connection guide having a rail slot so as to guide a fixing rail of the fixing base provided in the structure to be matched with the guide rail.

5. The module replacement device of claim 4, wherein the rail connection guide includes:
   the guide bottom surface provided by extending from the base plate; and
   a guide side wall provided by bending from the guide bottom surface and by extending from one of the side walls formed on the base plate, wherein
   the guide side wall is provided with an enlarged part that extends inclinedly from one of the side walls.

6. The module replacement device of claim 1, wherein the support member comprises:
   a wire provided with a connecting ring at at least one of opposite ends of the wire, with a turn buckle provided at an end of the wire such that the replacement base is horizontally mounted.

7. The module replacement device of claim 6, wherein the replacement base further includes a level.

8. The module replacement device of claim 2, wherein the support member comprises:

a wire provided with a connecting ring at at least one of opposite ends of the wire, with a turn buckle provided at an end of the wire such that the replacement base is horizontally mounted.

9. The module replacement device of claim 3, wherein the support member comprises:
a wire provided with a connecting ring at at least one of opposite ends of the wire, with a turn buckle provided at an end of the wire such that the replacement base is horizontally mounted.

10. The module replacement device of claim 4, wherein the support member comprises:
a wire provided with a connecting ring at at least one of opposite ends of the wire, with a turn buckle provided at an end of the wire such that the replacement base is horizontally mounted.

11. The module replacement device of claim 5, wherein the support member comprises:
a wire provided with a connecting ring at at least one of opposite ends of the wire, with a turn buckle provided at an end of the wire such that the replacement base is horizontally mounted.

* * * * *